Oct. 13, 1959 H. STROBEL 2,908,022
TOOL FOR CUTTING SCREW THREADS
Filed July 20, 1955 2 Sheets-Sheet 1

INVENTOR:
HERBERT STROBEL
By Kurt Kelman
his AGENT

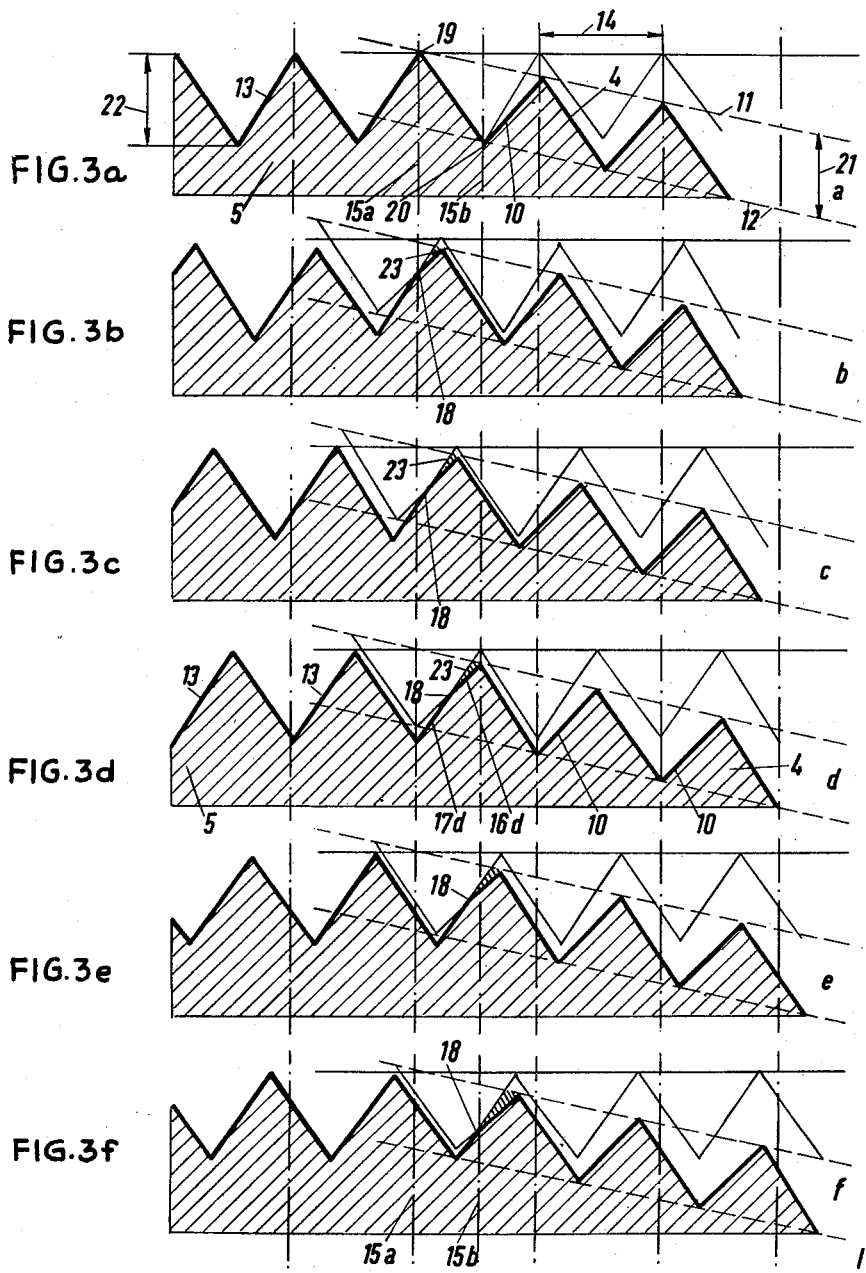

United States Patent Office 2,908,022
Patented Oct. 13, 1959

2,908,022

TOOL FOR CUTTING SCREW THREADS

Herbert Strobel, Frankfurt am Main, Germany

Application July 20, 1955, Serial No. 523,327

2 Claims. (Cl. 10—111)

The present invention relates to improvements in tools for cutting internal and external screw threads, and more particularly to cutting dies for such tools.

It is known to provide cutting tools of the above type with an initial conical cutting section followed by a cylindrical section. Numerous attempts have been made to arrange the cutting teeth in these cutting sections in such manner that the tool will not only center automatically when applied but will also cut a thread completely in one pass. However, the results have been uniformly unsatisfactory because it has proved to be almost impossible to go beyond the conical initial cutting section since the cutting teeth jam after a short time.

It is the principal object of the present invention to provide a thread cutting tool with a conical initial cutting section having cutting teeth of the same pitch as the cutting teeth of the succeeding cylindrical section, which tool will automatically center when applied and will effect complete cutting of internal or external threads of relatively great dimensions in a single pass.

According to the invention, the screw thread cutting tool comprises an initial conical section and an inwardly adjacent cylindrical section, a series of successive wedgelike cutting teeth forming the surface of said sections, each cutting tooth having a rear flank extending between the point and the root of the tooth, the rear flanks of the cutting teeth in the conical section being parallel to one another and inclined relatively to the rear flanks of the cutting teeth in the cylindrical section, the first-named rear flanks being shorter than the last-named rear flanks of the cutting teeth, the distances between planes normal to the axis of the tool and extending through adjacent points and roots of the cutting teeth in the conical and cylindrical sections being equal, and the pitch of all cutting teeth being the same.

The cutting tool preferably comprises a plurality of circularly arranged individual cutting dies forming said conical and cylindrical cutting sections.

In accordance with one embodiment of the invention, the rear flanks of the innermost cutting teeth in the conical sections of the individual dies consist of two relatively inclined component flanks, the boundary line between said component flanks extending helically inwardly within one pitch.

Figure 1:
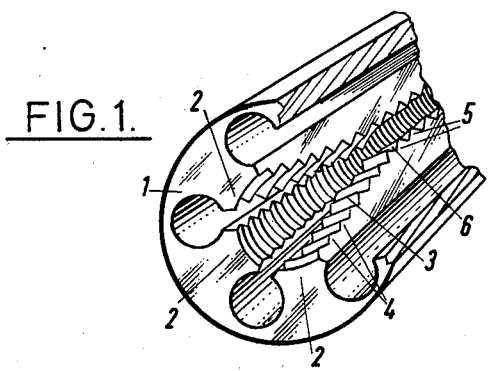
Figure 2:
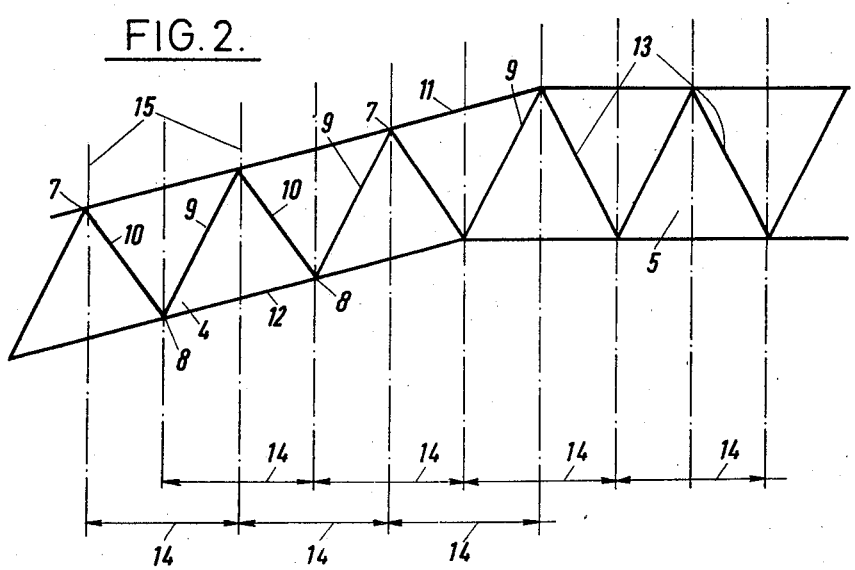

The above and other objects, features and advantages of the present invention will be more fully explained with reference to certain now preferred embodiments thereof, taken in conjunction with the drawing wherein Fig. 1 is a perspective view of the inside of a tool according to the invention for cutting external threads;

Fig. 2 schematically shows a partial elevation of a cutting die of the tool illustrated in Fig. 1;

Figs. 3a to 3f illustrate partial cross-sections a—f taken through six cutting dies of a cutting tool, for cutting an external thread.

The cutting tool 1, illustrated in Fig. 1, serves to produce an external thread of any desired dimension and has six cutting dies 2 which are directed radially inwardly in conventional manner. The cutting dies may be integral with the tool body, as shown. However, it is well known in the art to mount such dies removably in the tool body, and such an arrangement is within the scope of the invention. Cutting teeth 4 of initial cutting section 3, which tapers conically inwardly, are cut to full depth exactly like cutting teeth 5 of cylindrical section 6. Therefore, only the thread crests engage the workpiece originally.

As can be seen in Fig. 2, points 7 and roots 8 of cutting teeth 4 of the conical initial cutting section lie on concentric cones 11 and 12. Forward flanks 9 of all cutting teeth are parallel to one another. The rear flanks 10 of cutting teeth 4 are parallel to one another but are so inclined relatively to rear flanks 13 of the teeth 5 of the cylindrical section and are so shortened that pitch 14 defined by the distance of adjacent points 7 and roots 8, respectively, is the same in the initial cutting section and in the cylindrical section, that is, even in the conical section the inner cutting lines 8 lie, as in the cylindrical section, centrally between planes 15 which are normal to the axis and which extend through the outer cutting lines 7.

Figs. 3a to 3f illustrate, in section, cutting dies of a tool for cutting an external thread, the individual cutting dies having the conical initial cutting part according to the invention. The transition region part extends over approximately one pitch 14 between the perpendicular cutting planes. The rear flank of the innermost teeth of the conical initial cutting section comprises two component flanks. By way of example, this feature will be explained with reference to cutting die 3d in which the corresponding flank comprises a top component flank 16d and an inner component flank 17d. The component flank 16d is parallel with rear flanks 10 of teeth 4 of the initial cutting part, whereas the component flank 17d is parallel with the rear flanks 13 of teeth 5 of the cylindrical part. This rule applies to all the flanks in the transition region of the cutting dies 3b to 3f, whereas in the cutting die 3a the outer component flank has become zero, so that here the entire flank in the transition region is parallel with flanks 13 of teeth 5. As can be seen from the drawing, a boundary line 18 between the component flanks moves inwards from die to die, that is, towards the thread root. The boundary line 18, as seen over the whole periphery, extends spirally inwardly, that is, from thread point 19 of cutting die 3a, to the position 18 on cutting die 3f and then on to thread root 20 of cutting die 3a. From the latter point, rear flank 10 of adjacent tooth 4 begins, lying parallel to the rear flanks of the other teeth of the conical cutting part.

The concentric conical surfaces 11 and 12 are continued by circular surfaces upon which the respective points and roots of teeth 5 are located. As shown, outer surface 11 reaches to perpendicular plane 15a while inner surface 12 terminates at plane 15b which is axially offset by half of pitch.

Thread height 21 of the initial cutting part is smaller than thread height 22 of the cylindrical part. However, the thread height 21 increases to the height 22 in the transition region. Such increase in height, as can be seen with reference to the cutting die 3a, takes place within half a pitch between the thread root 20 and the thread point 19 of the corresponding thread tooth.

All six cutting dies, which can be clamped together in a holder and arranged over the periphery thereof, can be produced with a single cutting tool. It is assumed that the cylindrical part, i.e. teeth 5, has already been cut (see light lines Figs. 3a to 3b). After the teeth 5 have been cut, the conical part, i.e. teeth 4, is cut, and in the transition region between the conical and cylindrical parts, as much is removed from the rearward flank of the tooth in the transition region as is indicated by the hatched part 23. As a result, the flank which was previously parallel with the flanks 13 because of the machining of the teeth of the cylindrical part is interrupted, and the aforementioned component flanks 16d and 17d are produced with the boundary line 18 therebetween which extends inwardly from die to die.

It is obvious that the cutting dies hereinabove described could be integral with or removably mounted on a rod, forming the outer surface thereof and thus constituting a cutting tool for cutting internal threads.

While the invention has been described in connection with certain specific embodiments, many variations and changes may occur to those skilled in the art without departing from its spirit and scope as defined in the appended claims.

Throughout specification and following claims the "flanks" are the cutting edges of the teeth.

What I claim is:

1. A die for a screw thread cutting tool comprising an initial conical cutting section and an inwardly adjacent cylindrical cutting section, a series of wedge-like cutting teeth forming the surface of said sections, the cutting teeth in the conical section being of substantially full thread depth, each cutting tooth having a forward flank and a rear flank extending between the point and the root of the tooth, all forward flanks being parallel to each other, the rear flanks of the cutting teeth in the conical section being parallel to one another and inclined relatively to the rear flanks of the cutting teeth in the cylindrical section, the first-named rear flanks being shorter than the last-named rear flanks of the cutting teeth, the distances between planes normal to the axis of the tool and extending through adjacent points and roots of the cutting teeth in the conical and cylindrical sections being equal, and the pitch of all cutting teeth being the same, and further comprising a cutting tooth in a transition region between the conical and cylindrical cutting sections, the rear flank of said cutting tooth consisting of two components, the upper of said components being parallel to the rear flanks of the cutting teeth in the conical section and the component adjacent the root of the cutting tooth being parallel to the rear flanks of the cutting teeth of the cylindrical section.

2. A screw thread cutting tool comprising a plurality of the dies of claim 1 arranged peripherally on said tool, wherein the boundary lines between the component flanks of said cutting teeth in the transition region extend helically within about one thread pitch over said peripherically arranged cutting dies.

References Cited in the file of this patent

UNITED STATES PATENTS

| | | |
|---|---|---|
| 896,503 | Zogg | Aug. 18, 1908 |
| 1,447,700 | Wells | Mar. 6, 1923 |
| 1,923,423 | Crosby et al. | Aug. 22, 1933 |
| 2,150,037 | Reed et al. | Mar. 7, 1939 |
| 2,166,369 | Petersen | July 18, 1939 |
| 2,551,728 | Cybulski et al. | May 8, 1951 |

FOREIGN PATENTS

| | | |
|---|---|---|
| 1,100,772 | France | Apr. 6, 1955 |